US007412320B2

(12) United States Patent
Brummel

(10) Patent No.: US 7,412,320 B2
(45) Date of Patent: Aug. 12, 2008

(54) DETECTION OF GAS TURBINE AIRFOIL FAILURE

(75) Inventor: Hans-Gerd Johann Brummel, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 505 days.

(21) Appl. No.: 11/135,114

(22) Filed: May 23, 2005

(65) Prior Publication Data

US 2006/0263216 A1 Nov. 23, 2006

(51) Int. Cl.
*G06F 19/00* (2006.01)

(52) U.S. Cl. .......................... 701/100; 701/31; 415/115

(58) Field of Classification Search ..................... 701/1, 701/29–36, 100; 415/115, 118; 416/61, 416/97 R See application file for complete search history.

(56) References Cited

U.S. PATENT DOCUMENTS 4,057,371 A 11/1977 Pilarczyk
4,058,975 A 11/1977 Gilbert et al.
4,153,386 A * 5/1979 Leogrande et al. .......... 415/115
4,595,298 A 6/1986 Frederick
4,744,670 A 5/1988 Janssen
4,901,520 A 2/1990 Kozak et al.
4,916,715 A 4/1990 Adiutori
4,983,034 A 1/1991 Spillman, Jr.
5,014,544 A 5/1991 West
5,193,975 A * 3/1993 Bird et al. ................... 415/115
5,305,599 A 4/1994 Marvin
5,417,057 A 5/1995 Robey
5,442,285 A 8/1995 Zombo et al.
5,511,937 A 4/1996 Papageorgiou
5,670,879 A 9/1997 Zombo et al.
5,819,540 A 10/1998 Massarani
6,062,811 A 5/2000 Zombo et al.
6,142,665 A 11/2000 Haffner et al.
6,361,276 B1 3/2002 Beachum et al.
6,508,620 B2 1/2003 Sreekanth et al.
6,520,020 B1 2/2003 Lutz et al.
6,805,533 B2 10/2004 Schopf
6,838,157 B2 1/2005 Subramanian
2005/0042075 A1 2/2005 Yang et al.

FOREIGN PATENT DOCUMENTS

GB 1 499 550 2/1978

* cited by examiner

*Primary Examiner*—Richard M. Camby

(57) ABSTRACT

A system and method for early detection of a failure of a gas turbine engine airfoil (10), such as but not restricted to a burn through of the airfoil outer skin (12). A sensor (52) provides a signal (54) responsive to a condition of fluid flowing through an outer cooling chamber (24) of the airfoil. A detected change in the condition of the fluid is correlated to a failure of the airfoil, which for example can be detected by measuring the static fluid pressure. An increase in the static pressure of fluid in the outer cooling chamber may indicate a breach in the region of the leading edge of the airfoil. A decrease in the static pressure of fluid in the outer cooling chamber may indicate a breach along other portions of the profile of the airfoil outer skin. Both pressure and temperature parameters of the fluid may be measured and coincident changes thereof correlated to a condition of failure of the airfoil.

18 Claims, 2 Drawing Sheets

DETECTION OF GAS TURBINE AIRFOIL FAILURE

FIELD OF THE INVENTION

This invention is related generally to the field of gas turbine engines, and more particularly to identifying a failure of a gas turbine engine airfoil.

BACKGROUND

Gas turbine engines are known to include a compressor for compressing air, a combustor for mixing the compressed air with fuel and igniting the mixture, and a turbine for expanding the hot combustion gases to produce mechanical shaft power. Combustors operate at temperatures that may exceed 2,500 degrees Fahrenheit, thereby exposing the turbine blade and vane assemblies to these high temperatures. As a result, the turbine airfoils must be made of materials capable of withstanding such high temperatures. In addition, the airfoils often contain cooling systems for prolonging the life of the airfoils and reducing the likelihood of failure as a result of excessive temperatures.

Gas turbine airfoils have an outer skin defining the desired airfoil shape including a leading edge and a trailing edge and extending along a chord length. An outer skin of metal may by coated with a ceramic thermal barrier coating material for additional protection, especially in the first few rows of airfoils within the turbine, which are exposed to the highest temperatures and greatest fluid velocities. Inner structures of the airfoils typically define cooling channels for directing cooling fluid against the backside of the outer skin. The cooling fluid may be air extracted from the compressor/combustor flow path or it may be steam in some combined cycle plant applications. The cooling channels often include multiple flow paths designed to maintain all regions of the airfoil below a design temperature value, including impingement plates and holes for directing cooling fluid against the back side of the outer skin and film cooling holes through the outer skin for directing a layer of cooling air across the outer surface of the airfoil. See, for example, U.S. Pat. No. 5,511,937 issued on Apr. 30, 1996, and U.S. Pat. No. 4,153,386 issued on May 8, 1979. Centrifugal forces and flow boundary layers sometimes prevent certain areas of the airfoils from being adequately cooled, resulting in the formation of localized hot spots. Furthermore, contaminants in the cooling fluid can clog impingement orifices and film cooling orifices, resulting in additional localized hot spots. Also, debonding and/or spallation of the thermal barrier coating can result in such hot spots, as the thermal insulation material chips off, leaving the airfoil unprotected. Such hot spots can result in a premature failure of the airfoil and thereby necessitate replacement of the part. When an airfoil fails, portions of the airfoil may break off and strike downstream components of the turbine engine, thereby causing collateral damage that may be extremely costly.

A variety of systems have been used to monitor the performance of an airfoil during operation of a gas turbine engine. U.S. Pat. No. 4,595,298 issued on Jun. 17, 1986, describes a temperature detection system used on the exterior of a film cooled turbine airfoil. U.S. Pat. No. 4,983,034 issued on Jan. 8, 1991, describes a sensing fiber used to monitor strain levels at one or more locations of a composite member. U.S. Pat. No. 5,442,285 issued on Aug. 15, 1995, describes a stationary eddy current sensor used to examine a passing turbine blade. U.S. Pat. No. 6,838,157 issued on Jan. 4, 2005, describes the embedding of sensors within a ceramic thermal barrier coating of a gas turbine component. All of the patents mentioned in this Background section are incorporated by reference herein.

BRIEF DESCRIPTION OF THE DRAWINGS

The accompanying drawings illustrate embodiments of the present invention and, together with the description, disclose the principles of the invention.

DETAILED DESCRIPTION OF THE INVENTION

The present inventor has recognized a need for a tool that provides early detection of an actual failure of a gas turbine airfoil. The present inventor has further recognized that many existing diagnostic tools fail to provide practical information that can be used by an operator of a gas turbine engine to make a run-or-shutdown decision. For example, the measurement of stress in an airfoil or temperature in a thermal barrier coating may provide valuable information; however, such information is not necessarily directly indicative of failures of the airfoil that may give rise to a heightened risk of collateral damage. Furthermore, the measurement of blockage of coolant flow through impingement orifices or film cooling orifices does not provide a direct indication or prediction of actual failure of the airfoil.

Figure 1:
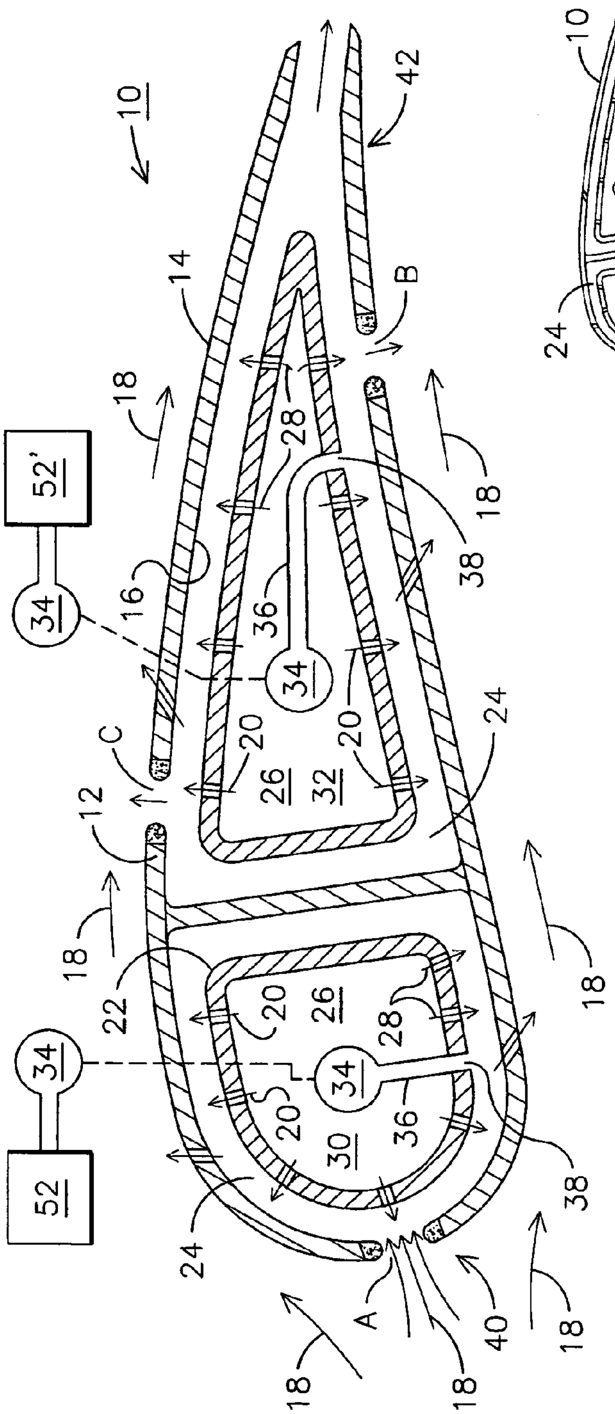
FIG. 1 is a schematic illustration of an airfoil for a gas turbine engine being monitored for failure of the airfoil outer skin.

Disclosed herein is a system and method of detecting a failure of the outer skin of an airfoil of a gas turbine engine. An airfoil 10 monitored by such a system is illustrated in FIG. 1 where an outer skin 12 has an outer surface 14 defining an airfoil shape and an inner surface 16. Hot combustion gas 18 flows over the outer skin outer surface 14 and a cooling fluid 20 is directed against the outer skin inner surface 16. An impingement structure 22 is positioned a distance from the inner skin inner surface 16 to define an outer cooling chamber 24 proximate the inner skin inner surface 16 and an inner cooling chamber 26. Impingement holes 28 in the impingement structure 22 direct cooling fluid 20 from the inner cooling chamber 26 into the outer cooling chamber 24 and against the inner skin inner surface 16. In the embodiment illustrated in FIG. 1, the airfoil 10 contains a forward inner cooling chamber 30 and a rearward inner cooling chamber 32, although other arrangements of cooling chambers are possible in other embodiments. The cooling fluid 20 may be compressed air, steam, or other appropriate fluid in various embodiments.

FIG. 1 also illustrates a means for measuring a parameter responsive to the flow of cooling fluid 20 through the outer cooling chamber 24. In the embodiment of FIG. 1, this function is accomplished with a pressure transducer 52/52' connected via a tube 36 or tubing arrangement 34/36 in fluid communication with an opening 38 in the impingement structure 22. The tube 36 may be welded or otherwise connected to be perpendicular to an opening 38 in the impingement structure 22, thereby allowing the pressure transducer 52/52' to provide a measurement of the static pressure of the cooling fluid 20 within the outer cooling chamber 24. Tube 36 may be extended and/or connected to other tubes 34 to allow the pressure transducer 52/52' to be located at any convenient location relative to the point of pressure measurement. The transducer 52/52' may preferably be located a distance away from the high temperature environment of the airfoil 10 in a more benign environment. FIG. 1 illustrates two openings 38 to provide pressure data at two locations, although one or more than two measurements points may be used in other embodiments.

A failure of the outer skin 12, which is a condition indicating a high risk of downstream collateral damage, will result in a change in the pressure detected by the pressure transducer 52. For example, should a burn through occur along a high impact pressure region of the airfoil 10, such as at the leading edge 40 of the airfoil 10 as illustrated at point A of FIG. 1, the dynamic head of the hot combustion gas 18 will force the gas 18 through the breach, thereby increasing the static pressure in the outer cooling chamber 24. Should a failure of the outer skin 12 occur along the airfoil profile other than at the leading edge 40, such as proximate to the trailing edge 42 of the pressure side as illustrated at point B of FIG. 1 or along the suction side as illustrated at point C of FIG. 1, the cooling fluid 20 will flow out of the airfoil 10 through the breach, thereby decreasing the static pressure in the outer cooling chamber 24. The term breach is used herein to denote a fluid flow path that is not part of the as-designed component.

Figure 2:
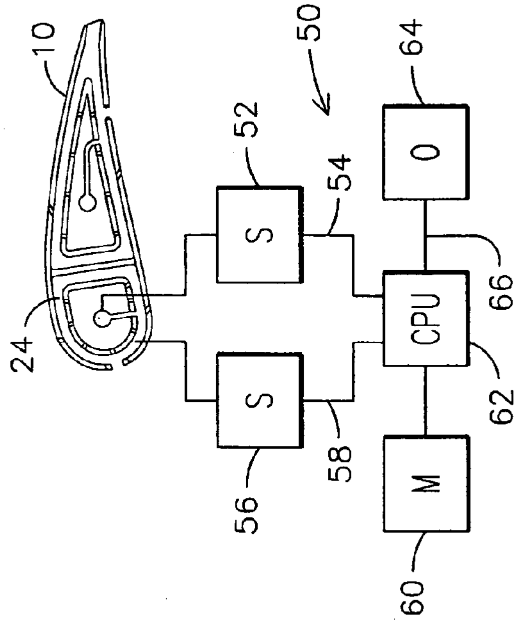
FIG. 2 is a block diagram of a system for detecting failure of the airfoil of FIG. 1.

A system 50 for detecting a failure of the airfoil 10 is illustrated in block diagram form in FIG. 2. One or more sensors 52, 56 provide(s) a signal(s) 54, 58 responsive to a condition of a flow of cooling fluid 20 through the outer cooling chamber 24 of the airfoil 10. In one embodiment, the condition of flow may be static pressure and the sensor may be the pressure transducer 52 of FIG. 1. A combination of sensors 52, 52', 56 may be used, either more than one of the same type of sensor in different locations or two or more different types of sensors. The sensor(s) may be any device that is able to measure flow, fluid velocity, dynamic and/or static pressure, temperature or other parameter responsive to a condition of the cooling fluid 20 flowing through the outer cooling chamber 24. Examples include but are not limited to Pitot tubes, static tubes, 5-hole probes, hot wire anemometers, static pressure sensors, dynamic pressure sensors, etc. In one embodiment, sensor 52 may be a pressure sensor and sensor 56 may be a different type of sensor, such as but not limited to a temperature sensor providing a signal 58 responsive to a temperature of fluid in the outer cooling chamber 52.

System 50 further includes a storage device 60 such as a hard drive or solid-state memory device for storing executable instructions in the form of a computer code for correlating a change in the signal(s) 54, 58 to conditions of failure of the airfoil 10. A central processing unit 62 is operative with the computer code stored in the storage device 60 to correlate a change in the signal(s) 54 with a condition of failure of the airfoil, such as a breach in the outer skin 12. The computer code may implement further process steps for characterizing the breach location, such as at the leading edge 40 or other location of high external pressure loads on the airfoil 10. An output device 64 is responsive to output signal 66 to provide an indication of the condition of failure in any desired form, such as a warning light, an acoustic warning signal, or a warning indication in a data recorder. Output signal 66 is also available for further downstream processing.

For the embodiment where sensor 52 is a pressure sensor and sensor 56 is a temperature sensor, the executable instructions implemented by processing unit 62 may include logic for providing an indication of a failure of the outer skin 12 at a location on a pressure side of the airfoil, such as proximate the leading edge 40, when signal 54 indicates an increase in pressure and signal 58 simultaneously indicates an increase in temperature. Output signal 66 may be directed to a plant control computer where automatic shutdown of the gas turbine may be initiated upon the determination of such an airfoil failure. Output signal 66 may be connected to a remote monitoring system in one embodiment, as these kinds of failures normally develop over time. A skilled diagnostics engineer may monitor and evaluate the data received, and/or sophisticated diagnostic tools may be used to process the information.

Embodiments of the present invention provide an early, simple and reliable detection of a failure of the outer skin of a gas turbine engine airfoil. Such failures may be caused by the erosion or spallation of a portion of a thermal barrier coating and a subsequent burn through of an underlying metal layer. Small breaches of the airfoil pressure boundary are detectable with the present invention before the failure progresses to the point where large parts of the airfoil break loose and result in severe collateral damage downstream of the airfoil. In one embodiment, the pressure measured within the outer cooling chamber 24 is compared to a pressure in another portion of the cooling fluid system, such as in the combustor shell for an air-cooled airfoil receiving compressed air from the engine compressor as the cooling fluid, to develop a differential pressure value which is smaller than a pressure measured against atmospheric pressure. The magnitude of a change in pressure in the outer cooling chamber 24 resulting from a breach of the outer skin 12 will then be relatively large when compared to this differential pressure, providing increased sensitivity to small breaches. In one case, a failure due to loss of a portion of a thermal barrier coating will start by localized melting of the underlying metal skin. The skin material thus set free typically includes only small particles at first. As the size of the breach continues to grow, so does the risk of significantly larger particles breaking free. Experience indicates that early detection of a local burn through of the outer skin can provide adequate time for action prior to the occurrence of downstream collateral damage. The present invention provides such an indication without necessarily providing information related to stress, strain or temperature of the hardware itself and without the need for providing information related to the functionality of impingement or film cooling holes of a cooling system. Furthermore, the present invention does not require, and in the embodiment described herein does not use, any measurement of any cooling fluid parameter in the inner cooling chamber 26 of the airfoil 10, but rather utilizes a measurement of a parameter responsive to cooling fluid flow in the outer cooling chamber 24.

Figure 3:
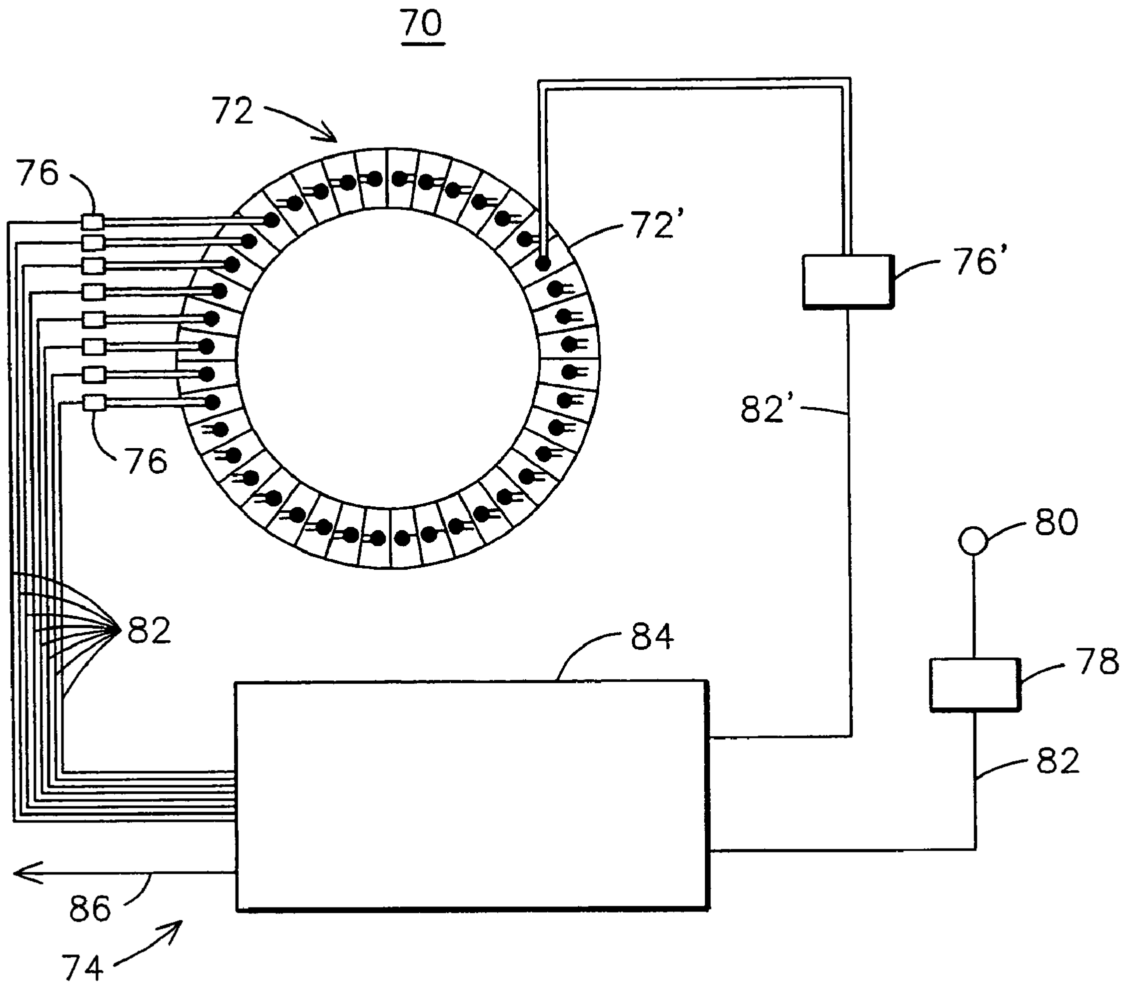
FIG. 3 is a schematic illustration of a gas turbine engine including a vane monitoring system.

FIG. 3 is a schematic illustration of a gas turbine engine 70 including a row of stationary airfoils (vanes) 72 that are illustrated schematically as viewed along a shaft rotational axis of the engine 70. The engine 70 is equipped with a vane monitoring system 74 operable to provide an early indication of a failure of the outer skin pressure boundary of any one of the vanes 72. In this embodiment, each of the vanes 72 is instrumented with one or more sensors indicative of the flow of cooling fluid through an outer cooling of the respective vane. The sensors are illustrated here as pressure transducers 76. One may appreciate that other embodiments may provide sensors for fewer than all of the vanes 72. Optionally, the system 74 may include a pressure transducer 78 providing a reference pressure measurement, such as a measurement of pressure at a location 80 within a shell of the gas turbine combustor. Each of the pressure transducers 76 (and optionally 78) provides a respective signal 82 responsive to the measured pressure to a controller 84, which may be any known type of computing/processing device. The controller 84 executes programmed logic for monitoring the signals 82 for changes indicative of a breach in any of the vanes 72. In one embodiment, selected ones of the vanes such as monitored vane 72', are monitored in sequence until all of the vanes 72 are monitored, with the monitoring process repeating in a predetermined period. The monitoring may be performed by comparing the pressure indicated by monitored signal 82' to a reference pressure, such as the pressure measured by reference pressure transducer 78. In embodiments without a separate reference transducer 78, the pressure in monitored vane 76' may be compared to the pressure in any one other vane 72, or to an average of the measured pressures in several or all other vanes 72, for example. Upon the detection of a difference of a predetermined magnitude between the compared pressures, controller 86 provides an appropriate alarm signal 86.

The foregoing is provided for purposes of illustrating, explaining, and describing embodiments of this invention. Modifications and adaptations to these embodiments will be apparent to those skilled in the art and may be made without departing from the scope or spirit of this invention.

The invention claimed is:

1. A method of detecting a failure of an airfoil of a gas turbine engine, the airfoil comprising an outer skin having an outer surface defining an airfoil shape and an inner surface, an impingement structure spaced from the inner surface to define an outer cooling chamber between the inner surface and the impingement structure and an inner cooling chamber, and impingement holes in the impingement structure for directing a cooling fluid from the inner cooling chamber into the outer cooling chamber and against the outer skin inner surface, the method comprising:

measuring a parameter responsive to a condition of a fluid flowing through the outer cooling chamber without measuring any parameter of cooling fluid in the inner cooling chamber; and correlating a change in the measured parameter to a failure of the outer skin.

2. The method of claim 1, further comprising measuring the parameter as a static fluid pressure within the outer cooling chamber.

3. The method of claim 1, further comprising:

measuring the parameter as a fluid pressure within the outer cooling chamber;

correlating an increase in the fluid pressure to a failure of the outer skin along a leading edge of the airfoil.

4. The method of claim 1, further comprising:

measuring the parameter as a fluid pressure within the outer cooling chamber;

correlating a decrease in the fluid pressure to a failure of the outer skin.

5. The method of claim 1, wherein the step of measuring a parameter comprises:

measuring a fluid pressure within the outer cooling chamber; and measuring a fluid temperature within the outer cooling chamber.

6. The method of claim 5, further comprising correlating a coincident decrease in the fluid pressure and increase in the fluid temperature to a failure of the outer skin proximate a leading edge of the airfoil.

7. The method of claim 1, further comprising measuring the parameter responsive to flow through the outer cooling chamber as a fluid velocity within the outer cooling chamber.

8. The method of claim 7, further comprising measuring fluid velocity within the outer cooling chamber by disposing a hot wire anemometer in the outer cooling chamber.

9. The method of claim 1, further comprising measuring the parameter responsive to flow through the outer cooling chamber as a difference between a static fluid pressure in the outer cooling chamber and a static fluid pressure at a second location within the gas turbine engine.

10. The method of claim 1, further comprising measuring the parameter responsive to flow through the outer cooling chamber as a difference between a static fluid pressure in the outer cooling chamber and a static fluid pressure within an outer cooling chamber of a second airfoil within the gas turbine engine.

11. The method of claim 1, further comprising measuring the parameter responsive to flow through the outer cooling chamber as a difference between a static fluid pressure in the outer cooling chamber and an average static fluid pressure within an outer cooling chamber of a plurality of other airfoils within the gas turbine engine.

12. The method of claim 1, further comprising measuring the parameter responsive to flow through the outer cooling chamber as a difference between a static fluid pressure in the outer cooling chamber and a static fluid pressure within a combustor shell of the gas turbine engine.

13. An apparatus for detecting a failure of an airfoil of a gas turbine engine, the airfoil comprising an outer skin having an outer surface defining an airfoil shape and an inner surface, an impingement structure spaced from the inner surface to define an outer cooling chamber between the inner surface and the impingement structure and an inner cooling chamber, and impingement holes in the impingement structure for directing a cooling fluid front the inner cooling chamber into the outer cooling chamber and against the outer skin inner surface, the apparatus comprising:

a sensor providing a signal responsive to at least one of a temperature and a rate of flow of a fluid flowing through the outer cooling chamber of the airfoil;

a storage device staring a computer code for correlating changes in the signal to a condition of failure of the airfoil;

a central processing unit operative with the computer code to correlate a change in the signal with the condition of failure of the airfoil; and an output device providing an indication of the condition of failure.

14. The apparatus of claim 13, further comprising:

a first sensor providing a first signal responsive to a pressure of the fluid flowing through the outer cooling chamber of the airfoil;

a second sensor providing a second signal responsive to a temperature of the fluid flowing through the outer cooling chamber of the airfoil; and the central processing unit operative with the computer code to correlate a change in the first signal coincident with a change in the second signal with the condition of failure.

15. The apparatus of claim 13, further comprising no sensor detecting a condition of a fluid flowing through the inner cooling chamber of the airfoil.

16. A vane monitoring system for a gas turbine engine comprising: a plurality of stationary vanes, each vane comprising an inner cooling chamber and an outer cooling chamber, the outer cooling chamber comprising an outer skin of the vane, the vane monitoring system comprising;

a plurality of sensors providing a respective plurality of signals responsive to a respective condition of fluid flowing through the respective outer cooling chamber of a plurality of the vanes;

a controller responsive to the plurality of signals to detect a change in the condition of the fluid flowing through the outer cooling chamber of one of the vanes compared to a corresponding condition of the fluid flowing through the outer cooling chamber of another of the vanes resulting from a breach of the outer skin of the one of the vanes; and an alarm signal output by the controller in response to the change in condition exceeding a predetermined value.

17. The vane monitoring system of claim 16, further comprising;

the sensors each comprising a pressure transducer measuring fluid pressure in the respective outer cooling chambers; and the controller responsive to a change in a difference between a measured pressure in one of the outer chambers compared to a measured pressure in another of the outer chambers.

18. The vane monitoring system of claim 16, further comprising:

the sensors each comprising a pressure transducer measuring fluid pressure in the respective outer cooling chambers; and the controller responsive to a change in a difference between a measured pressure in one of the outer chambers compared to an average of measured pressures in a plurality of others of the outer chambers.

* * * * *